Aug. 10, 1937.   R. POLK, JR   2,089,501
METHOD OF DESEEDING FRUITS OF THE NATURALLY SEGMENTED TYPE
Filed Aug. 2, 1935
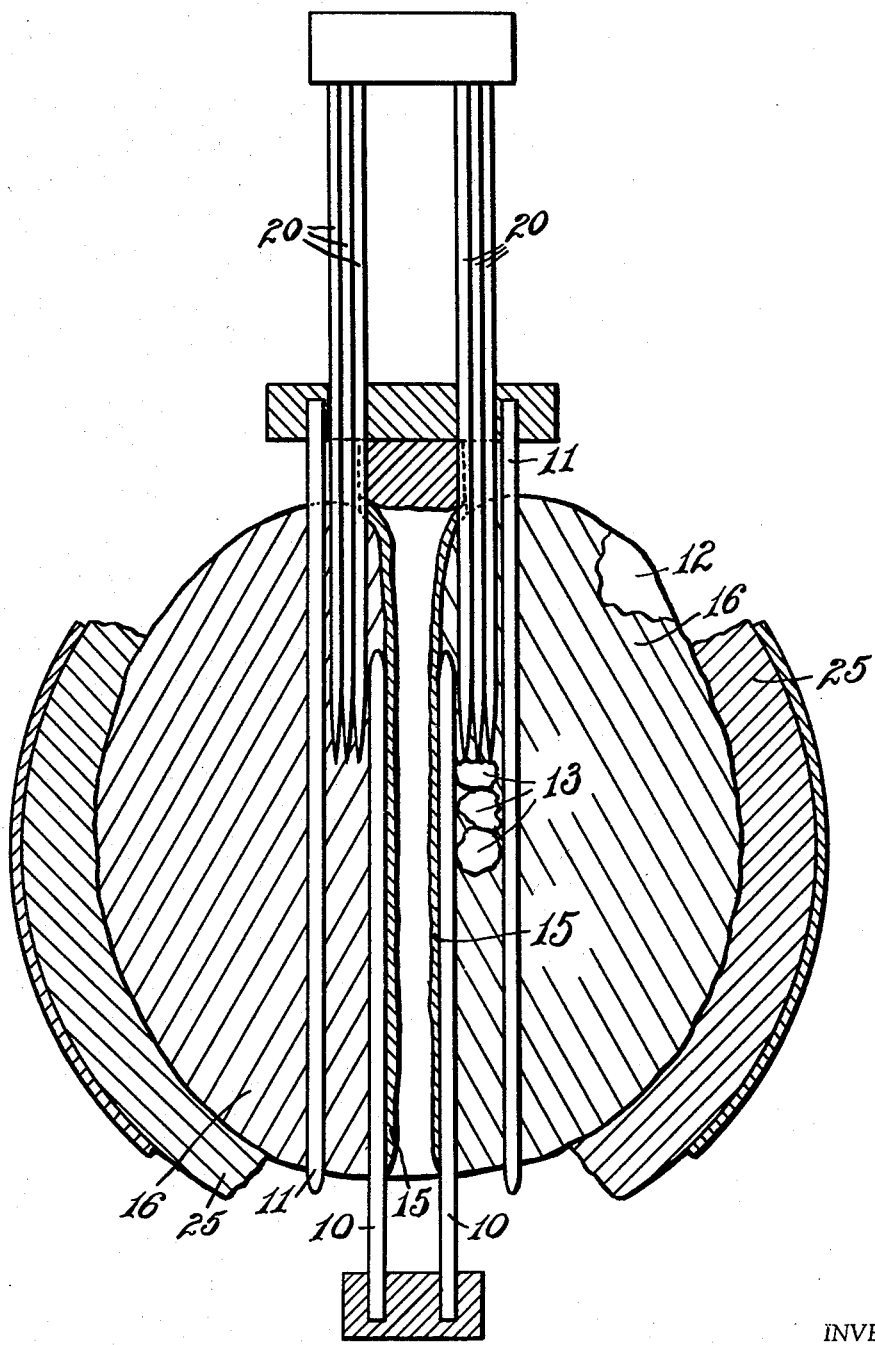
INVENTOR.
Ralph Polk Jr.,
BY
Hood & Hahn.
ATTORNEYS Patented Aug. 10, 1937

2,089,501

UNITED STATES PATENT OFFICE 2,089,501

METHOD OF DESEEDING FRUITS OF THE NATURALLY SEGMENTED TYPE

Ralph Polk, Jr., Haines City, Fla.

Application August 2, 1935, Serial No. 34,347

7 Claims. (Cl. 146—3)

My invention relates to an improved method of manipulating fruits of the type composed of nature-defined segments containing concentrated groups of seeds (such as grapefruit) whereby substantially whole segments, free from seeds and segment walls, may be obtained at less labor cost than heretofore.

In fruits of the type to which my improved method is applicable, the desired segments are each contained within a thin, relatively tough, transparent integument composed of two substantially radial walls and a connecting circumferential wall, and a variable number of such segments is grouped into a substantially spherical body enclosed in a skin, or rind, of varying thickness. Most of these segments contain groups of seeds concentrated medially in the apex of the segment.

Some years ago sealed packages of seed-free, substantially whole and integument-free segments of grapefruit were successfully placed upon the market. Such segments have heretofore been segregated by laborious and relatively expensive hand manipulation wherein, after the removal of the rind and circumferential segment-walls, a hand-manipulated knife is successively passed between the meat and the adherent radial integuments, and the seeds then extracted by the fingers of the operator. The meat is quite fragile and considerable skill and relatively considerable time is required to perform the above-described manipulation without breaking a wasteful proportion of the meat segments, owing to the care which must be exercised in avoiding such knife contact with the seeds, as the knife is projected between the meat and the adherent radial integument, as will press the seeds radially outwardly to cause rupture of the meat segment at its middle.

My improved method comprises an initial confinement of the seeds against radial displacement and a subsequent exertion of pressure upon the so-confined seeds to eject them from the meats parallel with the polar diameter of the fruit, whereby, thereafter, the meat segments may be more readily separated from their adherent radial integuments with less danger of rupturing the meat segments.

The accompanying drawing illustrates my improved method, together with implements, of preferred form, which facilitate performance of the method.

The drawing is a phantom view of a fruit from which has been removed the rind and circumferential segment walls, together with axial sections of implements for radially confining the seeds and an implement for ejecting the seeds from the fruit.

In the drawing 10 and 11 indicate two radially spaced annular series of comparatively small, circumferentially spaced, stiff pins having reduced free ends. The pins of each series are spaced from each other to permit the entry therebetween of radial segment-defining walls or partitions 12 of the fruit but are close enough together to prevent the seeds 13 from passing therebetween. Said pins are slightly laterally displaceable at their tips. The pins 10, of the inner series, conveniently correspond in number to the average number of segments in the fruit. In Florida seed-bearing grapefruit, this number varies from 11 to 15 or 16 and in many instances some of the segments, in fruits having more than an average number of segments, do not extend inward to the core and do not contain seeds.

The pins 11, of the outer series, are, of course, greater in number in order that their lateral spacing be considerably less than seed thickness.

All of the skin of the fruit, except perhaps a button at the stem pole, is preferably removed, as is likewise the tough diaphanous circumferential membrane which forms part of each segment-enclosing integument, thereby circumferentially exposing the meat segments 16.

Thereupon the seeds are radially confined by projecting pins 10 and 11 into and substantially through the fruit coaxially with the polar diameter, pins 10 lying in the apices of the segments between the radial integuments 15, and between the seeds 13 and the core, and the pins 11 lying radially just beyond the seeds and between the aforesaid radial integuments. The reduced but blunt ends of the pins prevent penetration and rupture of the radial integuments so that the pins will be laterally deflected, if necessary, as they penetrate the fruit, and thus adjust themselves to the vagaries of segment grouping of each fruit.

After the seeds have been thus radially confined I eject the seeds from one pole of the fruit by applying pressure thereto parallel with the polar diameter. This is most conveniently accomplished by means of an implement comprising a group of closely spaced pins 20 sharpened at their free ends. This group of pins is of such size that it may be projected between the two groups of pins 10 and 11 and the pins are so closely spaced that their sharpened ends will contact and impale the seeds as the group 20 is driven through the fruit.

If a button of outer skin is left in place it preferably has a diameter about that of the annulus formed by pins 10 and serves to restrain apex separation of the fruit segments during the above-described manipulation.

The pins 20 may be provided in a complete annular series projectible as a whole through the fruit between pin series 10 and 11 but I have found that there is less likelihood of fruit rupture if the circumferential extent of pin group 20 is relatively small. In that case, the amount of force required for seed ejection is so distributed through the main body of the fruit as to minimize rupture.

It will be understood, of course, that radial confinement of the seeds in any segment need be provided only during the period of seed ejection and that, therefore, the pin groups 10 and 11 need not be completely annular.

The fruit may be supported by hand during the period of seed ejection or may be supported solely by the pin groups 10—11 but I have found that it is quite desirable during seed ejection, to support the lower zone of the fruit in a cup composed of two or more segments of cushioning material 25, such as sponge rubber.

I claim as my invention:

1. That method of deseeding whole fruits of the type wherein groups of juice cells are contained within an integument of segmental form, which comprises the step of confining the seeds against substantial radial displacement either into adjacent juice-cell regions or toward the integument apices, and the step of ejecting the seeds polarwise while so confined substantially parallel with the polar diameter and through a polar region of the fruit body.

2. That method of deseeding whole fruits of the type wherein groups of juice cells are contained within an integument of segmental form, which comprises the step of confining the seeds against substantial radial displacement either into adjacent juice-cell regions or toward the integument apices, and the step of ejecting the seeds polarwise while so confined substantially parallel with the polar diameter and through a polar region of the fruit body, concurrently with the external radial and polar support of the exterior of the meat segment in the region of seed ejection.

3. That method of de-seeding fruits of the type wherein groups of juice cells are contained within an integument of segmental form, which comprises the removal from the major portion of the fruit, of the external skin and subjacent circumferential portions of the segmenting integuments and retention of a polar button of said skin and subjacent integument, the step of confining the seeds against substantial radial displacement and the step of ejecting the seeds substantially parallel with the polar axis while so confined.

4. That method of segmenting fruits of the type wherein groups of juice cells are contained within an integument of segmental form, which comprises the removal from the major portion of the fruit, of the external skin and subjacent circumferential portions of the segmenting integuments and retention of a polar button of said skin and subjacent integument, the step of confining the seeds against substantial radial displacement and the step of ejecting the seeds substantially parallel with the polar axis while so confined, concurrently with the external radial and polar support of the exterior of the meat segment in the region of seed ejection.

5. That method of deseeding whole fruits of the type wherein groups of juice cells are contained within an integument of segmental form, which comprises the step of removing the fruit skin from one polar region; the step of confining the seeds against substantial radial displacement either outwardly into the adjacent juice-cell region or toward the integument apices; and the step of driving the seeds, while so confined, substantially parallel with the polar axis of the fruit outwardly through the denuded polar region.

6. That method of deseeding whole fruits of the type wherein groups of juice cells are contained within an integument of segmental form, which comprises the step of penetrating the fruit substantially parallel with its polar diameter and radially beyond the seed region with an element capable of restraining the seeds against outward radial displacement; the step of penetrating the fruit substantially parallel with its polar diameter and between the seed region and apex portion of the segment integument with an element capable of restraining the seeds against inward radial displacement; and the step of driving the seeds, while so radially confined, outwardly from the fruit at a polar region.

7. That method of deseeding whole fruits of the type wherein groups of juice cells are contained within an integument of segmental form, which comprises the step of removing the fruit skin from one polar region; the step of penetrating the fruit substantially parallel with its polar diameter and radially beyond the seed region with an element capable of restraining the seeds against outward radial displacement; the step of penetrating the fruit substantially parallel with its polar diameter and between the seed region and the apex-portion of the segment integument with an element capable of restraining the seeds against inward radial displacement; and the step of driving the seeds, while so radially confined, outwardly from the fruit at the denuded polar region.

RALPH POLK, Jr.